(12) United States Patent
Shears (10) Patent No.: US 8,375,988 B2
(45) Date of Patent: Feb. 19, 2013

(54) FUEL TANK ASSEMBLY AND BAFFLE DEVICE

(75) Inventor: Peter D. Shears, Wauwatosa, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 1169 days.

(21) Appl. No.: 12/188,367

(22) Filed: Aug. 8, 2008

(65) Prior Publication Data

US 2009/0057309 A1 Mar. 5, 2009

Related U.S. Application Data

(60) Provisional application No. 60/969,221, filed on Aug. 31, 2007.

(51) Int. Cl.
*F17D 1/02* (2006.01)
*F16L 55/05* (2006.01)
*B65D 88/74* (2006.01)

(52) U.S. Cl. ............... 137/582; 137/202; 137/590
(58) Field of Classification Search ............ 137/202, 137/590, 582; 251/127; 220/563
See application file for complete search history.

(56) References Cited

U.S. PATENT DOCUMENTS

| | | | |
|---|---|---|---|
| 1,939,423 A | 12/1933 | Wahl | |
| 2,375,834 A | 5/1945 | Walker | |
| 3,727,629 A * | 4/1973 | Gifford | ............ 137/205 |
| 4,555,041 A | 11/1985 | Muehl | |
| 5,131,439 A | 7/1992 | Bucci | |
| 5,343,905 A | 9/1994 | Gryc et al. | |
| 5,449,029 A * | 9/1995 | Harris | ............ 141/198 |
| 6,274,209 B1 | 8/2001 | Pagidas et al. | |
| 6,557,578 B2 * | 5/2003 | Shimamura et al. | ............ 137/202 |
| 6,866,058 B1 * | 3/2005 | Brock et al. | ............ 137/202 |
| 6,959,696 B2 | 11/2005 | Shears et al. | |
| 7,159,577 B2 | 1/2007 | Haskew et al. | |
| 7,185,640 B2 | 3/2007 | Shears et al. | |
| 7,267,112 B2 | 9/2007 | Donahue et al. | |
| 7,517,392 B2 * | 4/2009 | Neff et al. | ............ 95/272 |
| 7,891,371 B2 * | 2/2011 | Pifer | ............ 137/202 |

FOREIGN PATENT DOCUMENTS

| | | |
|---|---|---|
| EP | 1642760 A2 | 4/2006 |
| GB | 1394015 | 5/1975 |
| GB | 2299073 | 9/1996 |

* cited by examiner

*Primary Examiner* — Craig Schneider
*Assistant Examiner* — Atif Chaudry
(74) *Attorney, Agent, or Firm* — Michael Best & Friedrich LLP (57) ABSTRACT

A baffle device, configured to be disposed near an outlet of a fuel tank, includes a fitting having an aperture therethrough and a first baffle. The first baffle includes a passageway in fluid communication with the aperture and a first baffle aperture configured to permit entry of fuel vapor into the passageway and exit of fuel vapor from the passageway. The baffle device also includes a second baffle overlying at least a portion of the first baffle aperture.

18 Claims, 8 Drawing Sheets

FIG. 22

FUEL TANK ASSEMBLY AND BAFFLE DEVICE

RELATED APPLICATIONS

This application claims priority to U.S. Provisional Patent Application Ser. No. 60/969,221 filed on Aug. 31, 2007, the entire content of which is incorporated herein by reference.

FIELD OF THE INVENTION

The present invention relates to internal combustion engines, and more particularly to fuel systems for internal combustion engines.

BACKGROUND OF THE INVENTION

Fuel systems for internal combustion engines often include a canister containing activated carbon that is connected to a fuel tank by a tube. Vapor vented from the fuel tank is routed to the canister to remove or adsorb hydrocarbons and other vapor emissions from the vapor before the vapor is vented to the atmosphere.

However, during operation of the engine or the equipment with which the engine is utilized, vibration of the engine or movement of the vehicle may cause fuel in the fuel tank to splash or slosh against the walls of the fuel tank. Excessive splashing or sloshing of fuel in the fuel tank may cause some fuel in the fuel tank to pass through the tube and leak into the canister. Once saturated with liquid fuel, activated carbon may become less efficient in removing or adsorbing hydrocarbons from the vapor vented from the fuel tank. Liquid in the venting system or carbon canister can adversely affect the operation of the fuel tank ventilation system.

SUMMARY OF THE INVENTION

The present invention provides, in one aspect, a baffle or liquid fuel barrier device configured for use with a fuel tank. The device substantially prevents liquid fuel from entering a carbon canister that absorbs fuel vapor.

The present invention provides, in one aspect, a baffle device configured to be disposed near an outlet of a fuel tank. The baffle device includes a fitting having an aperture therethrough and a first baffle. The first baffle includes a passageway in fluid communication with the aperture and at least one first baffle aperture configured to permit entry of fuel vapor into the passageway and exit of fuel vapor from the passageway. The baffle device also includes a second baffle overlying at least a portion of the first baffle aperture. The second baffle preferably includes a second baffle aperture that is misaligned with the first baffle aperture.

The present invention provides, in another aspect, a fuel tank assembly including a fuel tank having a wall at least partially defining a fuel-containing space, a fitting coupled to the wall, the fitting having an aperture therethrough, and a first baffle. The first baffle includes a passageway in fluid communication with the aperture and at least one first baffle aperture configured to permit entry of fuel vapor into the passageway and exit of fuel vapor from the passageway. The fuel tank assembly also includes a second baffle overlying at least a portion of the first baffle aperture.

The present invention provides, in yet another aspect, a baffle device including a fitting with an aperture therethrough. The aperture has an inlet end and an outlet end. The baffle device also includes a first baffle coupled to the fitting. The first baffle defines a first passageway in fluid communication with the inlet end of the aperture in the fitting. The first baffle includes a longitudinal slot. The baffle device further includes a second baffle coupled to the fitting. The second baffle defines a second passageway receiving at least a portion of the first baffle. The second baffle includes a longitudinal slot misaligned with the longitudinal slot in the first baffle. It is understood that the fitting, the aperture, and the baffles may be molded integrally as one piece with the wall of a plastic fuel tank. Alternatively, other constructions of the baffle device may incorporate both plastic and metal components that are separate from one another.

In each of the embodiments, the baffles preferably comprise one or more concentric, curved or arc-shaped members having slots in them or gaps between them to reduce the splashing of liquid fuel into or near the inlet end of the aperture in the fitting.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
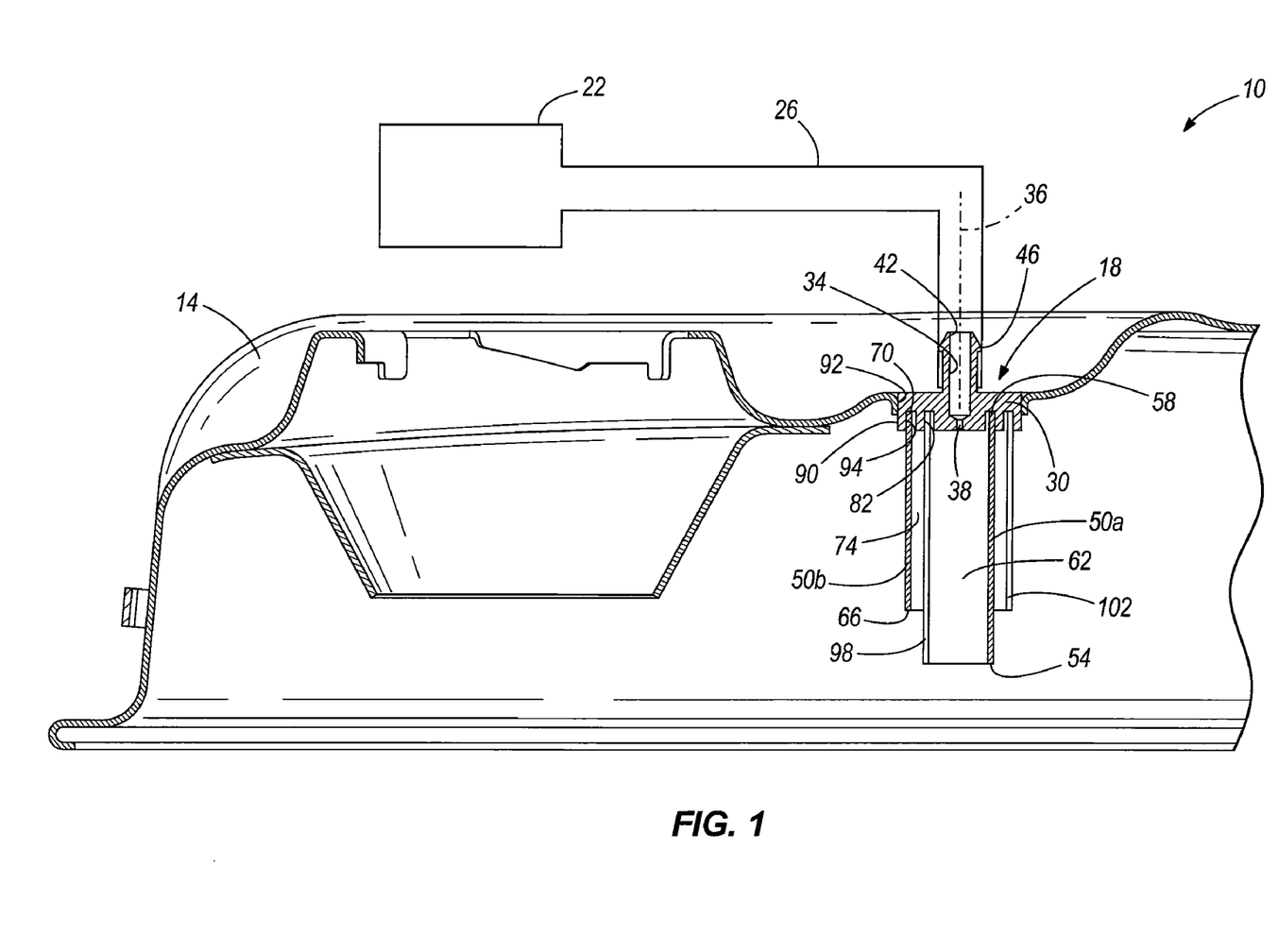
FIG. 1 is a cross-sectional view of a portion of a fuel tank assembly including a fuel tank, and a baffle device of the present invention coupled to the fuel tank.

FIG. 1 illustrates a fuel system 10 including a fuel tank assembly having a fuel tank 14 and a baffle device 18 coupled to the tank 14. The fuel system 10 also includes a canister 22 containing activated carbon and a tube 26 fluidly connecting the canister 22 and the baffle device 18. The canister 22 may be similar to the canister shown and described in U.S. Pat. No. 7,159,577, the entire content of which is incorporated herein by reference. The fuel system 10 may be used to provide fuel for internal combustion engines incorporated in outdoor power equipment (e.g., walk-behind lawn mowers, lawn tractors, generators, snow-throwers, and other non-hand held or hand-held outdoor power equipment).

Figure 2:
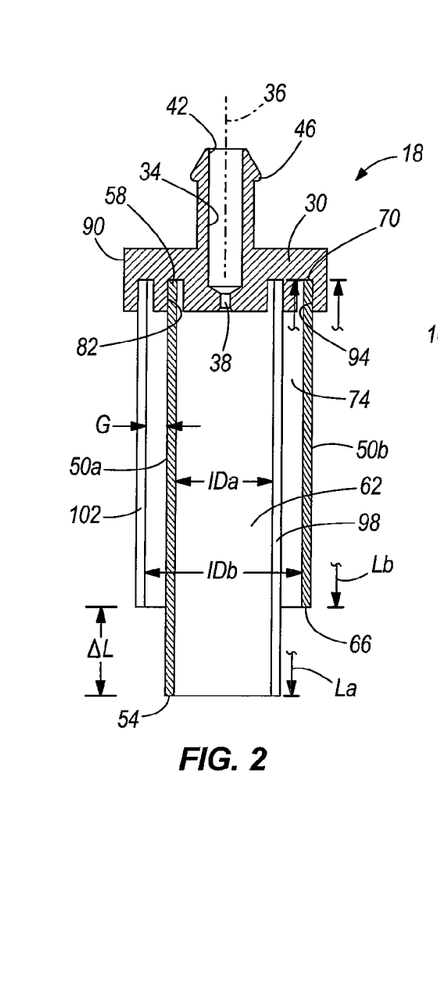
FIG. 2 is a cross-sectional view of the baffle device of FIG. 1
Figure 8:
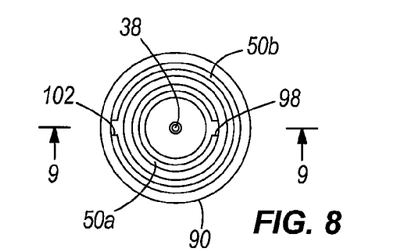
FIG. 8 is an assembled end view of the baffle device of FIG. 1.
Figure 9:
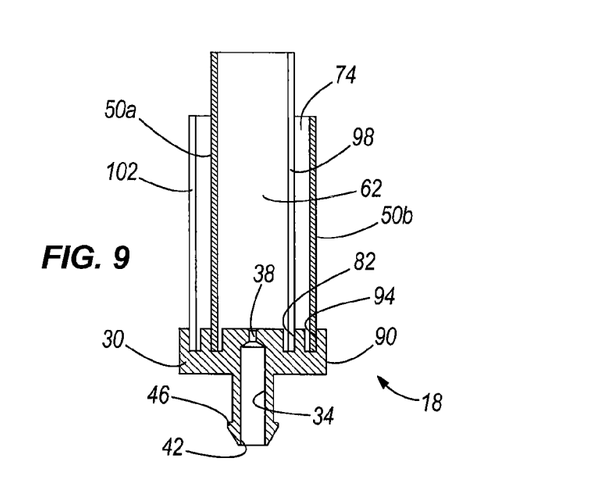
FIG. 9 is a cross-sectional view of the baffle device of FIG. 1, taken along line 9-9 in FIG. 8.

With reference to FIGS. 1-9, the baffle device 18 includes a fitting 30 having an aperture 34 defining a central axis 36. In the illustrated construction of the baffle device 18, the aperture 34 is configured as a stepped aperture 34, including an inlet end 38 and an outlet end 42 having different diameters. Specifically, the inlet end 38 of the aperture 34 has a diameter that is less than the diameter of the outlet end 42 of the aperture 34 to reduce the amount of liquid fuel that could flow through the aperture 34 and control the amount of vapor allowed to exit the tank 14 during refueling. In alternative constructions of the baffle device 18, the inlet end 38 of the aperture 34 may have a diameter that is greater than the diameter of the outlet end 42 of the aperture 34. Alternatively, the aperture 34 may have a substantially constant diameter from the inlet end 38 to the outlet end 42. The fitting 30 preferably also includes a barb 46 configured to be inserted into the tube 26 that fluidly interconnects the baffle device 18 and the canister 22 or other ventilation system components. As shown in FIGS. 1, 2, and 9, the aperture 34 passes through the barb 46.

Figure 22:
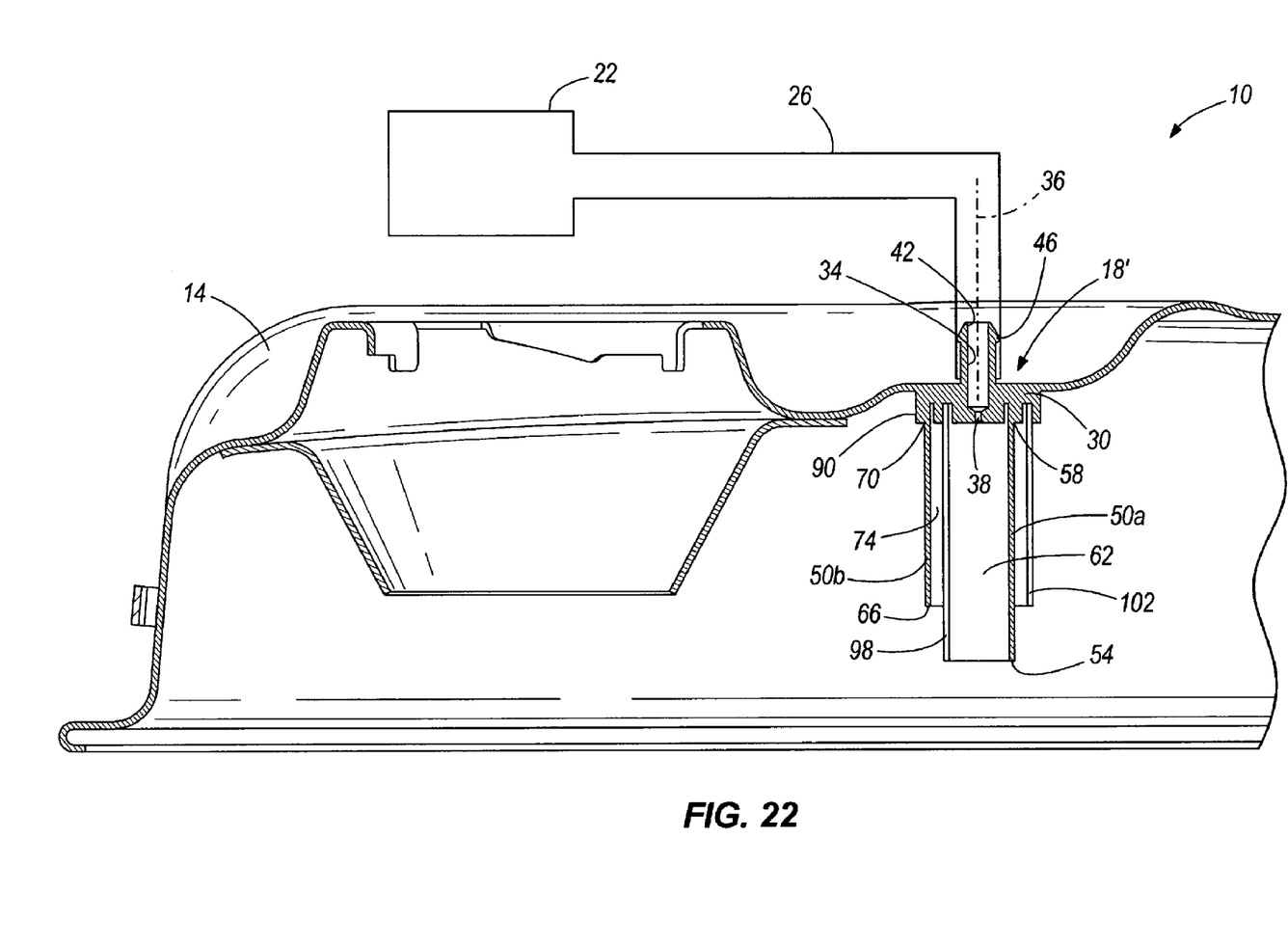
FIG. 22 is a cross-sectional view of a potion of a fuel tank assembly including a fuel tank, and a baffle device in accordance with an alternative embodiment of the invention coupled to the fuel tank.

With reference to FIGS. 1-9, the baffle device 18 also includes nested baffles 50a, 50b, each having a longitudinal axis coaxial with the central axis 36, coupled to the fitting 30. Alternatively, one or both of the nested baffles 50a, 50b may be non-collinear with the central axis 36. As shown in FIGS. 1-3 and 9, the baffle 50a includes respective ends 54, 58 and defines a passageway 62 between the respective ends 54, 58 of the baffle 50a. Likewise, the baffle 50b includes respective ends 66, 70 and defines a passageway 74 between the respective ends 66, 70 of the baffle 50b. The fitting 30 includes a cylindrical groove 78, at least partially defined by an inner peripheral wall 82, that is concentric with the aperture 34 (see FIG. 3). The baffle 50a is received within the groove 78 to fluidly communicate the passageway 62 and the aperture 34 in the fitting 30. In the illustrated construction of the baffle device 18, the outer diameter $OD_a$ of the baffle 50a and the outer diameter of the groove 78 are sized to provide an interference fit between the end 58 of the baffle 50a and the inner peripheral wall 82 (see FIG. 7). In alternative constructions of the baffle device 18, the baffle 50a may be coupled to the fitting 30 in any of a number of different ways to fluidly communicate the passageway 62 of the baffle 50a and the aperture 34 in the fitting 30. In yet other alternative constructions of the baffle device 18', the baffle 50a may be integrally formed as a single piece with the fitting 30 (see FIG. 22).

Figure 3:
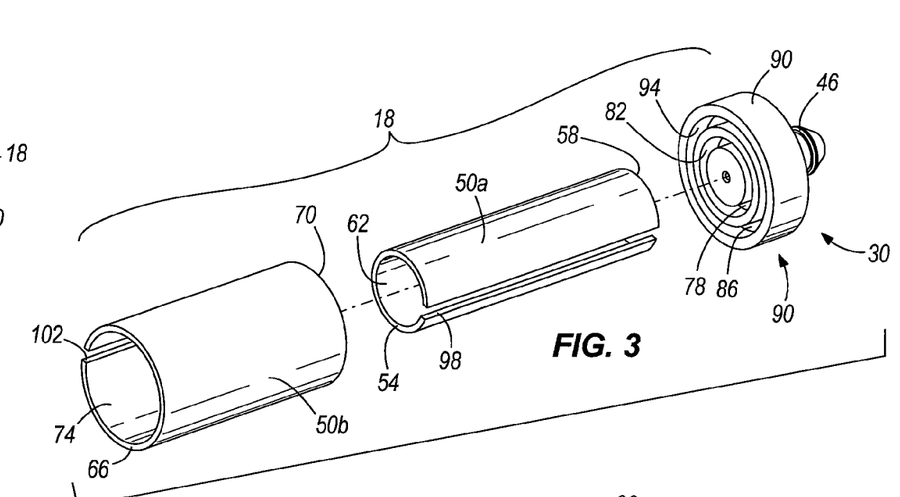
FIG. 3 is an exploded view of the baffle device of FIG. 1.

With continued reference to FIGS. 1-3 and 9, the fitting 30 also includes a second groove 86, at least partially defined by an inner peripheral wall 94, that is concentric with the first groove 78 and the aperture 34 (see FIG. 3). The baffle 50b is received within the groove 86, and at least a portion of the baffle 50a is positioned within the passageway 74 of the baffle 50b. In the illustrated construction of the baffle device 18, the outer diameter ODb of the baffle 50b (see FIG. 5) and the outer diameter of the groove 86 are sized to provide an interference fit between the end 70 of the baffle 50b and the inner peripheral wall 94. In alternative constructions of the baffle device 18, the baffle 50b may be coupled to the fitting 30 in any of a number of different ways to receive at least a portion of the baffle 50a within the passageway 74 of the baffle 50b. In yet other alternative constructions of the baffle device 18', the baffle 50b may be integrally formed as a single piece with the fitting 30 (see FIG. 22). Further, the baffle 50a may be coupled to the fitting 30 in any manner described above, and the baffle 50b may be directly coupled to the baffle 50a in any number of different ways (e.g., fastening, welding, using adhesives, integrally forming, etc.). Likewise, the baffle 50b may be coupled to the fitting 30 in any manner described above, and the baffle 50a may be directly coupled to the baffle 50b in any number of different ways (e.g., fastening, welding, using adhesives, integrally forming, etc.).

With reference to FIGS. 1-9, the fitting 30 further includes a cylindrical outer portion 90 sized to provide an interference fit with a peripheral surface defining an aperture 92 in the fuel tank 14 (see FIG. 1). The fitting 30 may also be welded to the fuel tank 14 or adhesives may be utilized to further secure the baffle device 18 to the fuel tank 14. Alternatively, at least a portion of the baffle device 18' (e.g., the fitting 30) may be integrally formed with a portion of the fuel tank 14 (e.g., a wall of the fuel tank 14 that at least partially defines a fuel-containing space) (see FIG. 22). Further, the respective baffles 50a, 50b may be integrally formed as a single piece with the fitting 30, or the baffles 50a, 50b may be integrally formed as a single piece with the fitting 30 and a portion of the fuel tank 14 (see FIG. 22). As a further alternative, other structure (e.g., a grommet) may be utilized to secure the baffle device 18 to the fuel tank 14.

With reference to FIG. 2, the baffle 50a is sized such that a ratio of the length La of the baffle 50a to the inner diameter IDa of the baffle 50a is at least about 3:1. Generally, increasing the ratio of the length La of the baffle 50a to the inner diameter IDa of the baffle 50a also steepens the angle at which fuel within the baffle 50a or fuel below the baffle 50a must splash to reach the aperture 34 through the passageway 62. With continued reference to FIG. 2, the baffle 50b is sized such that a ratio of the length Lb of the baffle 50b to the inner diameter IDb of the baffle 50b is at least about 2:1.

Figure 4:
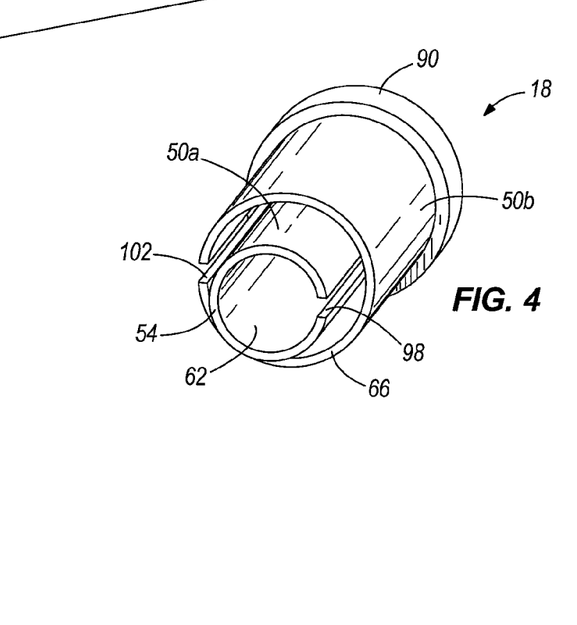
FIG. 4 is an assembled, end perspective view of the baffle device of FIG. 1.
Figure 5:
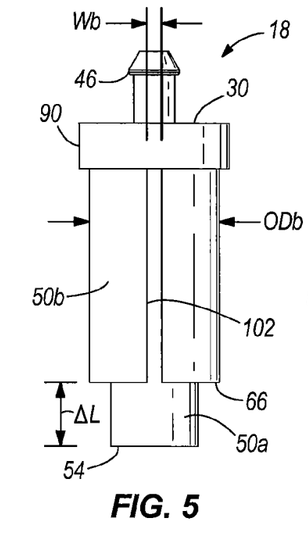
FIG. 5 is an assembled side view of the baffle device of FIG. 1.
Figure 6:
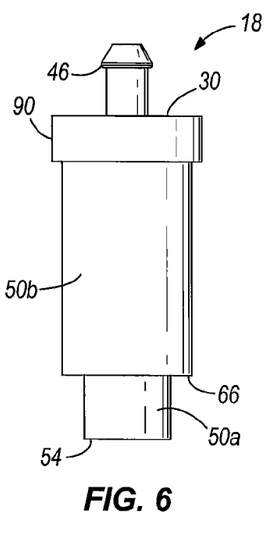
FIG. 6 is an assembled side view of the baffle device of FIG. 1.
Figure 7:
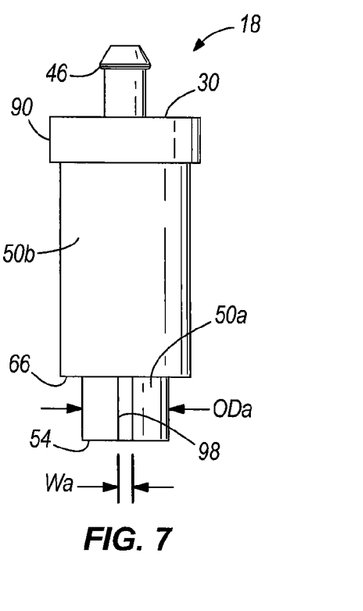
FIG. 7 is an assembled side view of the baffle device of FIG. 1.

With reference to FIGS. 3 and 4, the baffle 50a includes a first baffle aperture preferably configured as a longitudinal slot 98 extending between the respective ends 54, 58 of the baffle 50a. In the illustrated construction of the baffle device 18, the width Wa of the slot 98 is between about one-fourth of an inch and about one-sixteenth of an inch (see FIG. 7). The baffle 50b also includes a second baffle aperture preferably configured as a longitudinal slot 102 extending between the respective ends 66, 70 of the baffle 50b. In the illustrated construction of the baffle device 18, the width Wb of the slot 102 is at least about one-sixteenth of an inch (see FIG. 5), and is about equal to the width Wa of the slot 98. The widths Wa,Wb of the respective slots 98, 102 are sized small enough to reduce the amount of liquid fuel entering the passageway 62 through the baffles 50a, 50b in a direction substantially transverse to the central axis 36 of the aperture 34, yet large enough to allow sufficient vapor venting from the fuel tank 14 at high fill levels and tilt angles of fuel in the fuel tank 14. The widths Wa,Wb of the respective slots 98, 102 are also sized large enough to allow substantially uninhibited movement of air through the slots 98, 102 to allow replacement air to enter the fuel tank 14 when the fill level in the tank 14 decreases. Further, the widths Wa,Wb of the respective slots 98, 102 are sized large enough to substantially prevent liquid fuel in the fuel tank 14 from coalescing or bridging the widths Wa,Wb of the respective slots 98, 102 due to the effects of surface tension, viscosity, and surface energy that may otherwise inhibit the flow of vapor through the slots 98, 102. Alternatively, each of the baffles 50a, 50b may include one or more longitudinally-spaced apertures rather than the slots 98, 102.

With reference to FIGS. 3, 4, and 8, the respective slots 98, 102 of the baffles 50a, 50b are misaligned with one another such that the slot 98 in the baffle 50a is not in facing relationship with the slot 102 in the baffle 50b to provide a straight-line path through the baffles 50a, 50b in a direction substantially transverse to the central axis 36 of the aperture 34. Specifically, in the illustrated construction of the baffle device 18, the slot 98 in the baffle 50a is misaligned with the slot 102 in the baffle 50b by about 180 degrees. In alternative constructions of the baffle device 18, the slot 98 in the baffle 50a may be misaligned with the slot 102 in the baffle 50b by at least about 30 degrees. In yet other alternative constructions of the baffle device 18, the baffle 50b need not comprise a complete cylinder, but rather may comprise a portion of a cylinder (i.e., a curved or an arc-shaped portion) that is sufficiently long enough (e.g., about 60 or more degrees) to at least partially shield the slot 98 in the baffle 50a.

With reference to FIG. 2, the fitting 30 provides a gap G between the outer diameter ODa of the baffle 50a and the inner diameter IDb of the baffle 50b through which fuel vapor must flow to reach the passageway 62 of the baffle 50a and the aperture 34 in the fitting 30. The gap G is sized large enough for the same reasons as discussed above with respect to the widths Wa,Wb of the respective slots 98, 102, i.e., to substantially prevent liquid fuel from adhering or coalescing between the outer wall of the baffle 50a and the inner wall of the baffle 50b due to the effects of surface tension, viscosity, and surface energy that may otherwise inhibit the flow of vapor through the gap G.

With continued reference to FIG. 2, the end 54 of the baffle 50a is spaced from the end 66 of the baffle 50b by a length dimension ΔL along the central axis 36. Spacing the respective ends 54, 66 of the baffles 50a, 50b in this manner substantially reduces coalescence of fuel between the ends 54, 66 of the respective baffles 50a, 50b. The length dimension ΔL is sized large enough for the same reasons as discussed above with respect to the widths Wa,Wb of the respective slots 98, 102, i.e., to substantially prevent liquid fuel from adhering or coalescing between the ends 54, 66 of the respective baffles 50a, 50b due to the effects of surface tension, viscosity, and surface energy that may otherwise inhibit the flow of vapor between the baffles 50a, 50b and through the gap G. In the illustrated construction of the baffle device 18, the length dimension ΔL is greater than the gap G. Alternative constructions of the baffle device 18 in which the length dimension ΔL is decreased may also include an increased gap G to provide sufficient spacing between the ends 54, 66 of the respective baffles 50a, 50b to substantially prevent liquid fuel from coalescing between the ends 54, 66 of the respective baffles 50a, 50b. Alternative constructions of the baffle device 18 in which the gap G is decreased may also include an increased length dimension ΔL to provide sufficient spacing between the ends 54, 66 of the respective baffles 50a, 50b to substantially prevent liquid fuel from coalescing between the ends 54, 66 of the respective baffles 50a, 50b. In yet other alternative constructions, the baffle device 18 may, however, incorporate a length dimension ΔL at least as large as the gap G.

With reference to FIG. 1, assuming the level of fuel within the tank 14 is below the end 54 of the baffle 50a, fuel vapor in the tank 14 may exit the tank 14 by flowing directly through the passageway 62 of the baffle 50a (upwardly as shown in FIG. 1) and through the aperture 34 in the fitting 30 to reach the canister 22 via the tube 26. The nested baffles 50a, 50b, however, reduce the amount of liquid fuel, as it is splashed or sloshed against the walls of the fuel tank 14, that reaches the aperture 34 in the fitting 30 and the canister 22. Specifically, the misaligned slots 98, 102 in the baffles 50a, 50b provide a tortuous path that reduces the amount of liquid fuel that splashes through the baffles 50a, 50b, in a direction substantially transverse to the central axis 36, and into the passageway 62 of the baffle 50a or the aperture 34 in the fitting 30.

Should the fuel tank 14 be filled such that the fuel level is above the lower ends 54, 66 of the respective baffles 50a, 50b, fuel vapor in the tank 14 may exit the tank 14 by flowing through the tortuous path created by the misaligned slots 98, 102 in the baffles 50a, 50b, in a direction substantially transverse to the central axis 36. Upon reaching the passageway 62 of the baffle 50a, the fuel vapor may flow through the aperture 34 in the fitting 30 to reach the canister 22 via the tube 26. However, the nested baffles 50a, 50b reduce the amount of liquid fuel, as it is splashed or sloshed against the walls of the fuel tank 14, that reaches the aperture 34 in the fitting 30 in substantially the same manner as described above when the level of fuel in the fuel tank 14 is below the respective lower ends 54, 66 of the baffles 50a, 50b.

Figure 10:
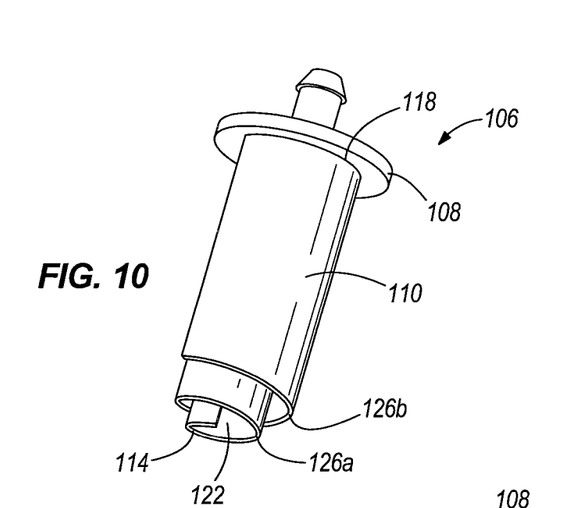
FIG. 10 is a side perspective view of a second construction of a baffle device of the present invention.
Figure 11:
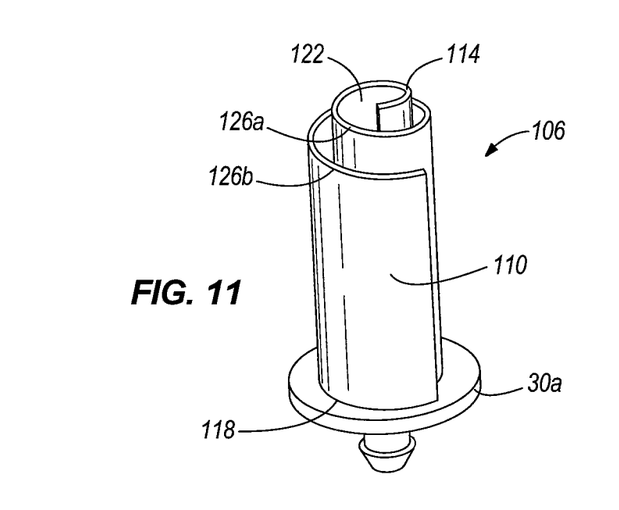
FIG. 11 is a side perspective view of the baffle device of FIG. 10.
Figure 12:
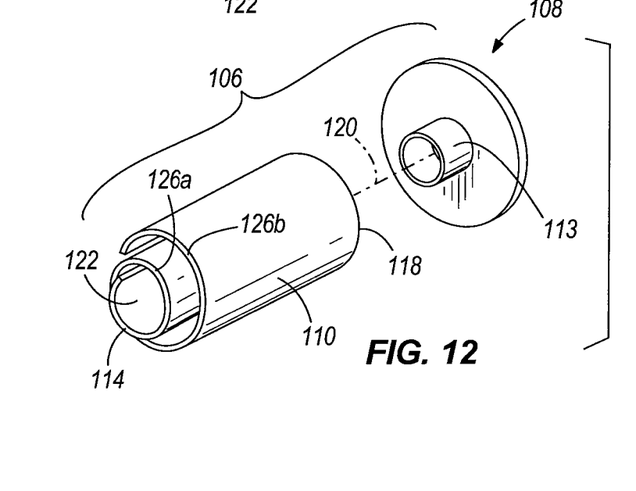
FIG. 12 is an exploded, end perspective view of the baffle device of FIG. 10.
Figure 13:
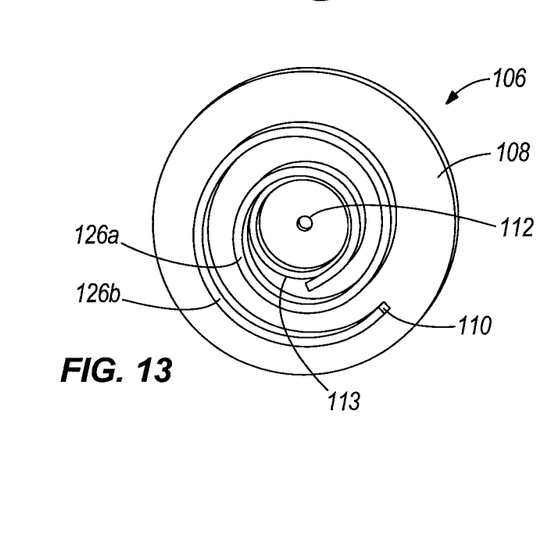
FIG. 13 is an end perspective view of the baffle device of FIG. 10.
Figure 14:
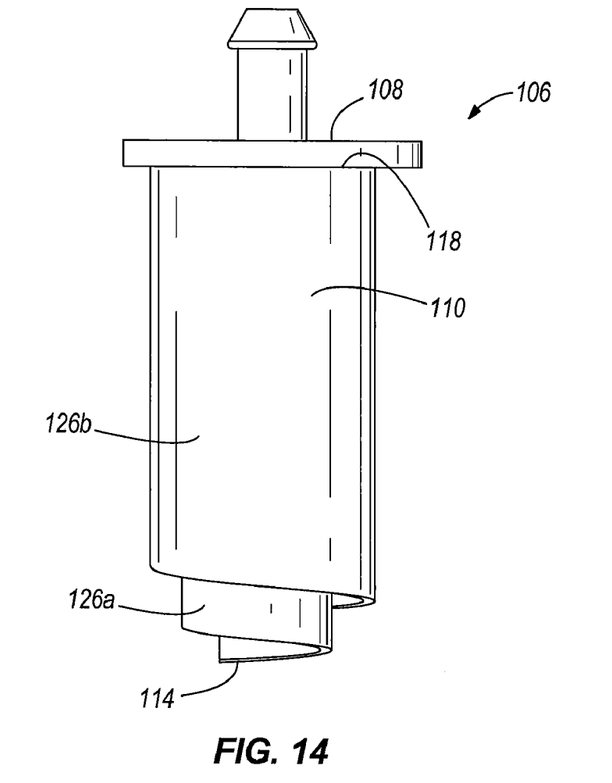
FIG. 14 is a side view of the baffle device of FIG. 10.
Figure 15:
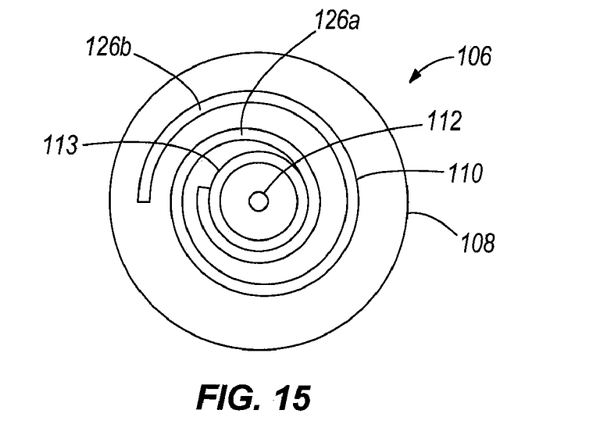
FIG. 15 is an end view of the baffle device of FIG. 10.

FIGS. 10-15 illustrate a second construction of a baffle device 106 configured for use with the fuel tank 14, the tube 26, and the canister 22 of FIG. 1. Like the baffle device 18, the baffle device 106 includes a fitting 108 having an aperture 112 therethrough and a cylindrical outer portion 113. With reference to FIGS. 10-12, the baffle device 106 also includes a spiraled baffle 110 having respective ends 114, 118 and defining a passageway 122 between the respective ends 114, 118 of the baffle 110. The spiraled baffle 110 includes nested windings 126a, 126b that define a spiraled tortuous path about a central axis 120 of the aperture 112 (see FIG. 12). In the illustrated construction of the baffle device 106, the interior winding 126a is engaged with the cylindrical outer portion 113 of the fitting 108 by an interference fit to secure the baffle 110 to the fitting 108 (see FIG. 13). In alternative constructions of the baffle device 106, the baffle 110 may be coupled to the fitting 108 in any of a number of different ways to fluidly communicate the passageway 122 of the baffle 110 and the aperture 112 in the fitting 106.

As previously stated, the baffle device 106 may be utilized with the fuel tank 14, the tube 26, and the canister 22 of FIG. 1. Assuming the level of fuel within the tank 14 is below the end 114 of the baffle 110, fuel vapor in the tank 14 may exit the tank 14 by flowing directly through the passageway 122 of the baffle 110 and through the aperture 112 in the fitting 108 to reach the canister 22 via the tube 26. The nested windings 126a, 126b, however, reduce the amount of liquid fuel, as it is splashed or sloshed against the walls of the fuel tank 14, that reaches the aperture 112 in the fitting 108 and the canister 22. Specifically, the nested windings 126a, 126b provide a tortuous path that reduces the amount of liquid fuel that splashes through the nested windings 126a, 126b of the baffle 110, in a direction substantially transverse to the central axis 120, and reaches the passageway 122 of the baffle 110 or the aperture 112 in the fitting 108.

Should the fuel tank 14 be filled such that the fuel level is above the lower end 114 of the baffle 110, fuel vapor in the tank 14 may exit the tank 14 by flowing through the tortuous path created by the nested windings 126a, 126b along a path spiraled about the central axis 120. Upon reaching the passageway 122 of the baffle 110, the fuel vapor may flow through the aperture 112 in the fitting 108 to reach the canister 22 via the tube 26. However, the nested windings 126a, 126b reduce the amount of liquid fuel, as it is splashed or sloshed against the walls of the fuel tank 14, that reaches the aperture 112 in the fitting 108 in substantially the same manner as described above when the level of fuel in the fuel tank 14 is below the lower end 114 of the baffle 110.

Figure 16:
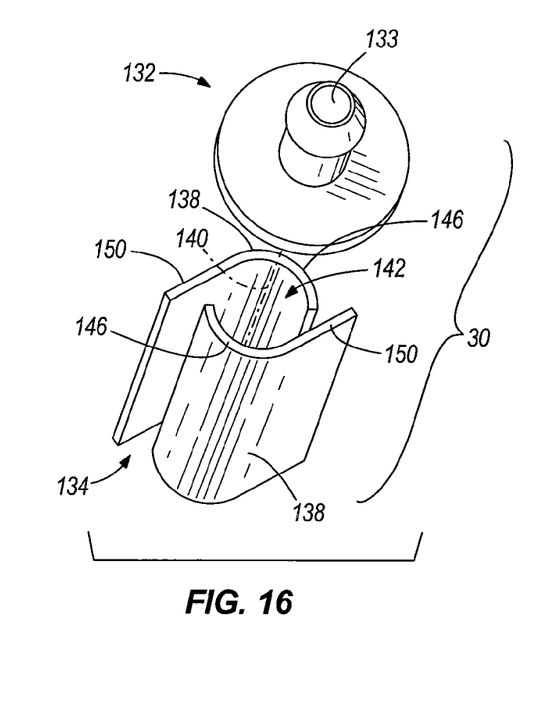
FIG. 16 is an exploded, end perspective view of a third construction of a baffle device of the present invention.
Figures 17, 18:
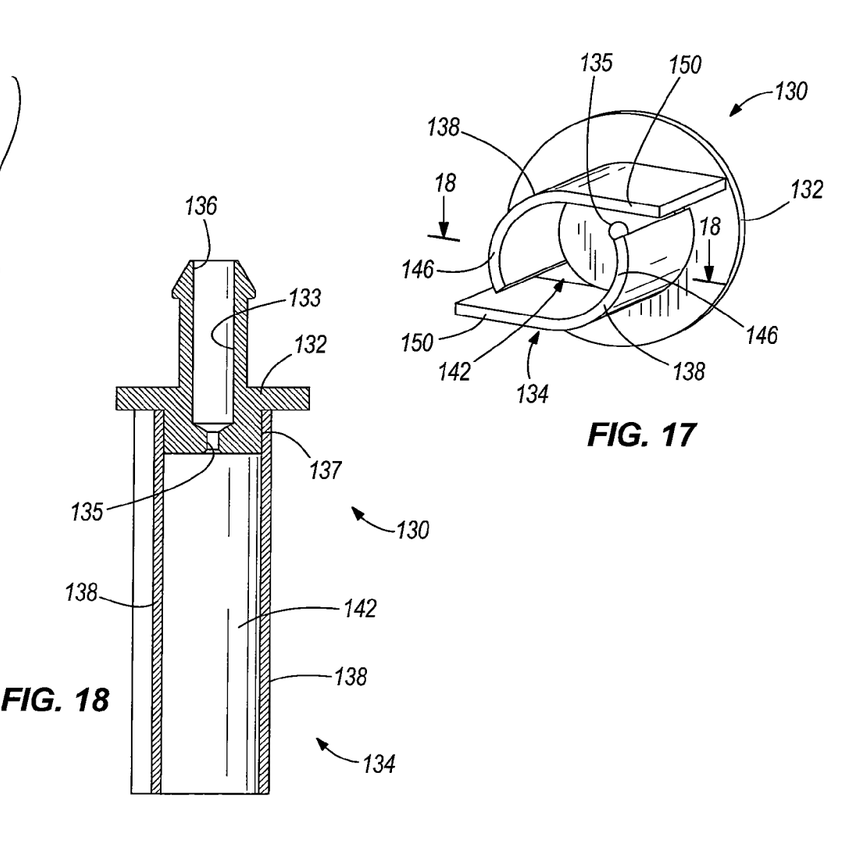
FIG. 17 is an assembled, end perspective view of the baffle device of FIG. 16.
FIG. 18 is a cross-sectional view of the baffle device of FIG. 16, taken along line 18-18 in FIG. 17.
Figure 19:
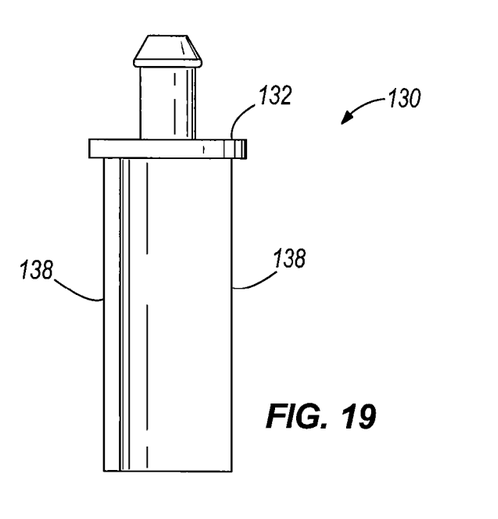
FIG. 19 is a side view of the baffle device of FIG. 16.
Figure 20:
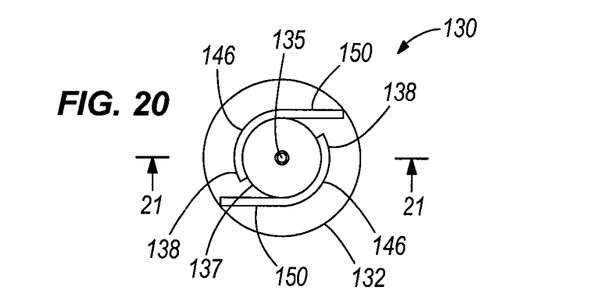
FIG. 20 is an end view of the baffle device of FIG. 16.
Figure 21:
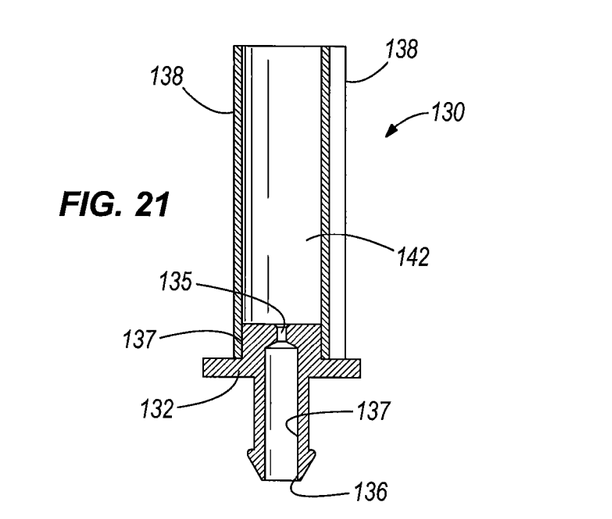
FIG. 21 is a cross-sectional view of the baffle device of FIG. 16, taken along line 21-21 in FIG. 20.

FIGS. 16-21 illustrate a third construction of a baffle device 130 configured for use with the fuel tank 14, the tube 26, and the canister 22 of FIG. 1. Like the baffle device 18, the baffle device 130 includes a fitting 132 having a stepped aperture 133 therethrough, with an inlet end 135 and an outlet end 136, and a cylindrical outer portion 137 (see FIG. 18). With reference to FIGS. 16, 17, and 20, the baffle device 130 includes a two-piece baffle 134 including opposed J-shaped baffles 138 defining a passageway 142 between the respective baffles 138. Each J-shaped or other curved baffle 138 includes a substantially curved or cylindrical portion 146 and a straight portion 150 extending from the curved or cylindrical portion 146. In the illustrated construction of the baffle device 130, the respective arced, curved, or cylindrical portions 146 of the J-shaped baffles 138 engage the cylindrical outer portion 137 of the fitting 132 by an interference fit to secure the respective baffles 138 to the fitting 132 (see FIG. 20). In alternative constructions of the baffle device 130, the two-piece baffle 134 may be coupled to the fitting 132 in any of a number of different ways to fluidly communicate the passageway 142 defined by the baffles 138 and the aperture 133 in the fitting 132.

As previously stated, the baffle device 130 may be utilized with the fuel tank 14, the tube 26, and the canister 22 of FIG. 1. Assuming the level of fuel within the tank 14 is below the lower end of the two-piece baffle 134, fuel vapor in the tank 14 may exit the tank 14 by flowing directly through the passageway 142 defined between the baffles 138 and through the aperture 133 in the fitting 132 to reach the canister 22 via the tube 26. The curved or cylindrical portions 146 of the baffles 138 and the straight portions 150 of the baffles 138, however, reduce the amount of liquid fuel, as it is splashed or sloshed against the walls of the fuel tank 14, that reaches the aperture 133 in the fitting 132 and the canister 22. Specifically, the J-shaped baffles 138 provide tortuous paths between the curved or cylindrical portion 146 of one baffle 138 and the straight portion 150 of the other baffle 138 to reduce the amount of liquid fuel that splashes through the two-piece baffle 134, in a direction substantially transverse to a central axis 140 of the aperture 133 (see FIG. 16), and reaches the passageway 142 defined between the baffles 138 or the aperture 133 in the fitting 132.

Should the fuel tank 14 be filled such that the fuel level is above the lower end of the two-piece baffle 134, fuel vapor in the tank 14 may exit the tank 14 by flowing through the tortuous paths created between the curved or cylindrical portion 146 of one baffle 138 and the straight portion 150 of the other baffle 138. Upon reaching the passageway 142 defined between the respective baffles 138, the fuel vapor may flow through the aperture 133 in the fitting 132 to reach the canister 22 via the tube 26. However, the two-piece baffle 134 reduces the amount of liquid fuel, as it is splashed or sloshed against the walls of the fuel tank 14, that reaches the aperture 133 in the fitting 132 in substantially the same manner as described above when the level of fuel in the fuel tank 14 is below the lower end of the two-piece baffle 134.

Various features of the invention are set forth in the following claims.

What is claimed is:

1. A baffle device configured to be disposed near an outlet of a fuel tank having a fuel-containing space, the baffle device comprising:
    a fitting having an aperture therethrough;
    a first baffle including
        a passageway in fluid communication with the aperture in the fitting;
        an opening positioned opposite the fitting and directly exposing the passageway to the fuel-containing space;
        a first baffle length;
        a first baffle aperture configured to permit entry of fuel vapor into the passageway and exit of fuel vapor from the passageway; and
    a second baffle overlying at least a portion of the first baffle aperture and including
        a second baffle length;
        a second baffle aperture configured to be positioned in the fuel-containing space and configured as a longitudinal slot in the second baffle extending the entire length of the second baffle;
    wherein the first and second baffles define a gap therebetween through which fuel vapor is permitted to flow, and wherein the first baffle length is greater than the second baffle length, thereby inhibiting coalescence of fuel in the gap.

2. The baffle device of claim 1, wherein the first baffle aperture is configured as a longitudinal slot in the first baffle.

3. The baffle device of claim 1, wherein the second baffle includes a passageway therethrough, and wherein the first baffle is at least partially positioned within the passageway of the second baffle.

4. The baffle device of claim 3, wherein an inner peripheral surface of the second baffle is spaced from an outer peripheral surface of the first baffle, in a direction substantially transverse to a longitudinal axis of the first baffle.

5. The baffle device of claim 1, wherein the second baffle includes a passageway therethrough, and wherein the second baffle aperture is configured to permit entry of fuel vapor into the passageway of the second baffle and exit of fuel vapor from the passageway of the second baffle.

6. The baffle device of claim 5, wherein the first baffle is at least partially positioned within the passageway of the second baffle, and wherein the first baffle aperture and the second baffle aperture are misaligned.

7. The baffle device of claim 6, wherein the first baffle aperture and the second baffle aperture are misaligned by about 180 degrees relative to a longitudinal axis of the first baffle.

8. The baffle device of claim 1, wherein at least one of the first and second baffles is coupled to the fitting.

9. The baffle device of claim 1, wherein the first and second baffles are configured as hollow concentric cylinders.

10. A fuel tank assembly comprising:
a fuel tank including a wall at least partially defining a fuel-containing space;
a fitting coupled to the wall, the fitting having an aperture therethrough;
a first baffle including
 a passageway in fluid communication with the aperture in the fitting;
 an opening positioned opposite the fitting and directly exposing the passageway to the fuel-containing space;
 a first baffle length;
 a first baffle aperture configured to permit entry of fuel vapor into the passageway and exit of fuel vapor from the passageway; and
a second baffle overlying at least a portion of the first baffle aperture and including
 a second baffle length;
 a second baffle aperture configured to be positioned in the fuel-containing space and configured as a longitudinal slot in the second baffle extending the entire length of the second baffle;
wherein the first and second baffles define a gap therebetween through which fuel vapor is permitted to flow, and wherein the first baffle length is greater than the second baffle length, thereby inhibiting coalescence of fuel in the gap.

11. The fuel tank assembly of claim 10, wherein the first baffle aperture is configured as a longitudinal slot in the first baffle.

12. The fuel tank assembly of claim 10, wherein the second baffle includes a passageway therethrough, and wherein the first baffle is at least partially positioned within the passageway of the second baffle.

13. The fuel tank assembly of claim 12, wherein an inner peripheral surface of the second baffle is spaced from an outer peripheral surface of the first baffle, in a direction substantially transverse to a longitudinal axis of the first baffle.

14. The fuel tank assembly of claim 10, wherein the second baffle includes a passageway therethrough, and wherein the second baffle aperture is configured to permit entry of fuel vapor into the passageway of the second baffle and exit of fuel vapor from the passageway of the second baffle.

15. The fuel tank assembly of claim 14, wherein the first baffle is at least partially positioned within the passageway of the second baffle, and wherein the first baffle aperture and the second baffle aperture are misaligned.

16. The fuel tank assembly of claim 15, wherein the first baffle aperture and the second baffle aperture are misaligned by about 180 degrees relative to a longitudinal axis of the first baffle.

17. The fuel tank assembly of claim 10, wherein the fitting is formed as one piece with the wall of the fuel tank.

18. The fuel tank assembly of claim 10, wherein the first and second baffles are formed as one piece with the fitting.

\* \* \* \* \*